(12) United States Patent
Jokinen et al.

(10) Patent No.: US 8,494,528 B2
(45) Date of Patent: Jul. 23, 2013

(54) METHOD, APPARATUS AND COMPUTER PROGRAM PRODUCT FOR PRIORITY BASED CELL RESELECTION IN A MULTI-RAT ENVIRONMENT

(75) Inventors: Harri Jokinen, Pertteli (FI); Vlora Rexhepi, Ml Den Hoorw (NL); Leonardo Provvedi, Eastleigh (GB)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/148,793

(22) PCT Filed: Feb. 9, 2010

(86) PCT No.: PCT/EP2010/051583
§ 371 (c)(1),
(2), (4) Date: Jan. 18, 2012

(87) PCT Pub. No.: WO2010/092049
PCT Pub. Date: Aug. 19, 2010

(65) Prior Publication Data
US 2012/0122458 A1    May 17, 2012

Related U.S. Application Data

(60) Provisional application No. 61/151,651, filed on Feb. 11, 2009.

(51) Int. Cl.
*H04W 36/00* (2009.01)
(52) U.S. Cl.
USPC ........... 455/437; 455/436; 455/438; 455/439; 455/442; 455/443; 455/432.1
(58) Field of Classification Search
USPC .. 455/127.4, 432.1, 432.3, 434, 435.1–435.3, 455/436–444, 449, 502, 515, 524, 525, 550.1, 455/552.1, 553.1; 370/310, 310.2, 328–333, 370/335, 338
See application file for complete search history.

(56) References Cited

U.S. PATENT DOCUMENTS 6,978,142 B2 * 12/2005 Jokimies ........................ 455/449
7,092,711 B2 *  8/2006 Masuda et al. ................ 455/439
(Continued)

FOREIGN PATENT DOCUMENTS

WO   WO 2008/099341 A2    8/2008
WO   WO 2009/007720 A2    1/2009

OTHER PUBLICATIONS

3GPP TS 25.304 V8.4.0 (Dec. 2008) 3rd Generation Partnership Project; Technical Specification Group Radio Access Network; User Equipment (UE) procedures in idle mode and procedures for cell reselection in connected mode (Release 8).*

(Continued)

*Primary Examiner* — Olumide T Ajibade Akonai
(74) *Attorney, Agent, or Firm* — Harrington & Smith

(57) ABSTRACT

A method, apparatus and computer program product are therefore provided that may enable a network sending broadcast and/or dedicated priorities to a mobile terminal to also include priorities with respect to a RAT that does not support the priority algorithm. As such, for example, priority parameters for a legacy network that does not support the priority algorithm may be supplied to a mobile terminal to enable the mobile terminal to make cell reselection decisions without running two different cell reselection algorithms in parallel (e.g., a ranking based algorithm and a priority based algorithm). The provided method includes the steps of receiving an indication of a plurality candidate cells with respect to said cell reselection of a mobile terminal; assigning, toward each of said plurality of candidate cells, a priority, wherein at least one candidate cell of the plurality of candidate cells does not support priority based cell reselection; and providing said priorities to said mobile terminal.

19 Claims, 7 Drawing Sheets

U.S. PATENT DOCUMENTS

| | | | |
|---|---|---|---|
| 7,330,732 B2* | 2/2008 | Wilborn et al. | 455/502 |
| 8,000,706 B2* | 8/2011 | Lee et al. | 455/435.2 |
| 8,081,999 B2* | 12/2011 | Vaittinen et al. | 455/525 |
| 2007/0004445 A1* | 1/2007 | Dorsey et al. | 455/525 |
| 2008/0045262 A1* | 2/2008 | Phan et al. | 455/525 |
| 2008/0268843 A1* | 10/2008 | Ore et al. | 455/435.3 |
| 2009/0047958 A1* | 2/2009 | Rimhagen et al. | 455/436 |
| 2009/0088160 A1* | 4/2009 | Pani et al. | 455/436 |
| 2010/0029274 A1* | 2/2010 | Deshpande et al. | 455/435.3 |
| 2010/0105382 A1* | 4/2010 | Gallagher | 455/434 |
| 2010/0159917 A1* | 6/2010 | Majmundar et al. | 455/423 |
| 2010/0222055 A1* | 9/2010 | Cho et al. | 455/434 |
| 2010/0240368 A1* | 9/2010 | Fox et al. | 455/435.3 |
| 2010/0273485 A1* | 10/2010 | Huang et al. | 455/435.3 |

OTHER PUBLICATIONS

3GPP TS 45.008 V8.1.0 (Nov. 2008) 3rd Generation Partnership Project; Technical Specification Group GSM/EDGE Radio Access Network; Radio subsystem link control (Release 8).*

3GPP TS 25.304 V7.7.0 (Sep. 2008), "$3^{rd}$ Generation Partnership Project; Technical Specification Group Radio Access Network; User Equipment (UE) Procedures in Idle Mode and Procedures for Cell Reselection in Connected Mode (Release 7)", 41 pgs.

3GPP TS 25.304 V8.4.0 (Dec. 2008), "$3^{rd}$ Generation Partnership Project; Technical Specification Group Radio Access Network; User Equipment (UE) Procedures in Idle Mode and Procedures for Cell Reselection in Connected Mode (Release 8)", 46 pgs.

R2-086526, 3GPP TSG-RAN WG2 Meeting #63 bis, Prague, Czech Republic, Nov. 10-14, 2008, Nokia Corporation et al., 3 pgs.

R2-091160, 3GPP TSG-RAN WG2 Meeting #65, Athens, Greece, Feb. 9-13, 2009, Qualcomm Europe, 2 pgs.

R2-091252, 3GPP TSG-WG2 Meeting #65, Athens Greece, Feb. 9-13, 2009, CATT, 2 pgs.

IEEE Std. 802.11a-1999 (Supplement to IEEE Std. 802.11-1999), "Part 11: Wireless LAN Medium Access Control (MAC) and Physical Layer (PHY) Specifications: High-Speed Physical Layer in the 5 GHz Band", 90 pgs.

IEEE Std. 802.11b-1999, (Supplement to ANSI/IEEE Std. 802.11, 1999 Edition), "Part 11: Wireless LAN Medium Access Control (MAC) and Physical Layer (PHY) Specifications: Higher-Speed Physical Layer Extension in the 2.4 GHz Band", 96 pgs.

IEEE Std. 802.11g™—2003, (Supplement to IEEE 802.11™, 1999 Edition (Reaff 2003), "Part 11: Wireless LAN Medium Access Control (MAC) and Physical Layer (PHY) Specifications: Amendment 4: Further Higher Data Rate Extension in the 2.4 GHz Band", 78 pgs.

* cited by examiner

METHOD, APPARATUS AND COMPUTER PROGRAM PRODUCT FOR PRIORITY BASED CELL RESELECTION IN A MULTI-RAT ENVIRONMENT

TECHNOLOGICAL FIELD

Embodiments of the present invention relate generally to cell reselection technology in a multiple radio access technology (RAT) environment and, more particularly, relate to an apparatus, method and a computer program product for enabling priority based cell reselection in a multi-RAT environment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Such increased ease of information transfer and convenience to users has recently been accompanied by an increased ability to provide mobile communications at a relatively low cost. Accordingly, mobile communication devices are becoming ubiquitous in the modern world. With the rapid expansion of mobile communications technology, there has been a related rapid expansion in those services that are demanded and provided via mobile communication devices.

Over the history of mobile communications, there have been many different generations of systems developed to enable the use of such communication devices. The first generations of these systems were sometimes developed independently and, at least initially, were not necessarily usable in cooperation with other systems. However, cooperation between communication system developers began to be employed so that new technologies could be enabled to have the potential for synergistic cooperation with other technologies in order to increase overall capacity. Thus, a mobile terminal operable in second generation (e.g., 2G) systems such as GSM (global system for mobile communications) or IS-95, which replaced the first generation of systems, may in some cases be useable in cooperation with newer generation systems such as third generation systems (e.g., 3G) and others that are currently being developed (e.g., E-UTRAN (Evolved Universal Terrestrial Radio Access Network)).

The ability of a particular mobile terminal to access multiple systems or communicate via multiple radio access technologies (multi-RAT) is sometimes referred to as "multi-radio access" (MRA). An MRA capable terminal may therefore be enabled to transfer between different RATs (e.g., UTRAN, E-UTRAN, GERAN (GSM EDGE radio access network)). Under certain circumstances, a mobile terminal (or user equipment (UE)) may perform cell reselection in order to transfer between different RATs. In this regard, for example, due to signal loss or signal strength reduction in a current serving cell, the UE may reselect another cell. Various procedures governing cell reselection have been developed to try to maintain communication continuity and provide for selection of the best available cell (regardless of RAT) in a multi-RAT environment.

The Third Generation Partnership Project (3GPP) has specified reselection procedures in various technical specifications (TSs). For example, 3GPP TS 25.304 provides cell reselection procedures for UTRAN. These procedures account for the fact that existing equipment in the field may have different ages and/or capabilities based on the upgrades that have been incorporated therein. As such, for example, a priority based cell reselection algorithm was introduced to use absolute priorities to make cell reselection choices in connection with 3GPP Release-8 (Rel-8) networks, while Rel-7 and older previously deployed networks that are not upgraded to support the priority based cell reselection algorithm may instead use a legacy algorithm for cell reselection that is based on cell ranking instead of cell priority.

When reselecting to a target RAT that does not support the priority based algorithm, existing methods have taken the view that reselection towards such a RAT should also be based on cell ranking. As such, "symmetric" reselection rules would be applied between both RATs. In order to achieve this behavior, if a UE in UTRAN has received no priority information for any frequency of a target RAT in a selected public land mobile network (PLMN), the UE uses the legacy cell reselection algorithm towards the RAT that does not support priority based cell reselection. However, when the serving network interworks with two or more other networks, this could lead to scenarios where the priority algorithm and the legacy algorithm are running within the UE in parallel, thereby causing excessive complexity in the UE. Moreover, some alternatives to the running of parallel algorithms may lead to situations in which reselection of RATs that do not support priority based reselection may be completely disabled and thus particular RATs may effectively be disabled from being selected. Accordingly, changes to the procedures for inter-RAT cell reselection may be desirable.

BRIEF SUMMARY OF EXEMPLARY EMBODIMENTS

A method, apparatus and computer program product are therefore provided that may enable a network sending broadcast and/or dedicated priorities to a mobile terminal to also include priorities with respect to a RAT that does not support the priority algorithm. As such, for example, priority parameters for a legacy network that does not support the priority algorithm may be supplied to a mobile terminal to enable the mobile terminal to make cell reselection decisions without running two different cell reselection algorithms in parallel (e.g., a ranking based algorithm and a priority based algorithm).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
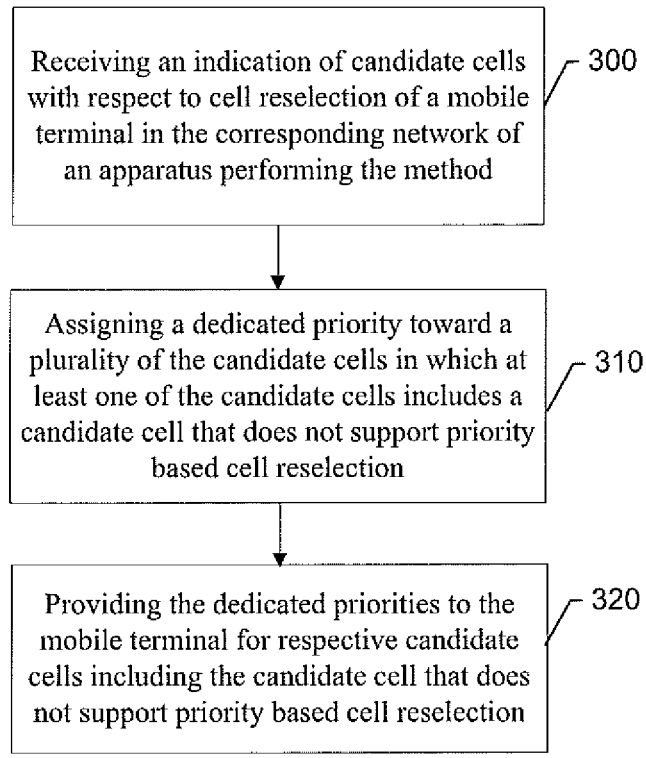
Figure 7:
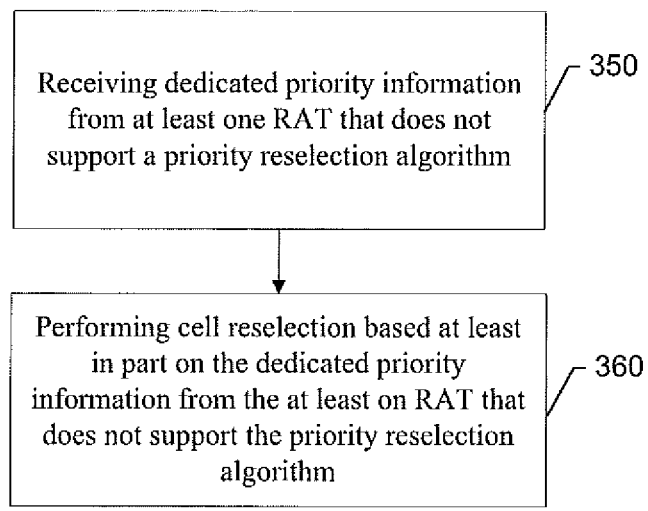

FIG. 6 is a flowchart according to an exemplary method of enabling priority based cell reselection in a multi-RAT environment according to an exemplary embodiment of the present invention; and FIG. 7 is a flowchart according to an exemplary method of enabling priority based cell reselection in a multi-RAT environment from the perspective of a mobile terminal according to an exemplary embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Figure 1:
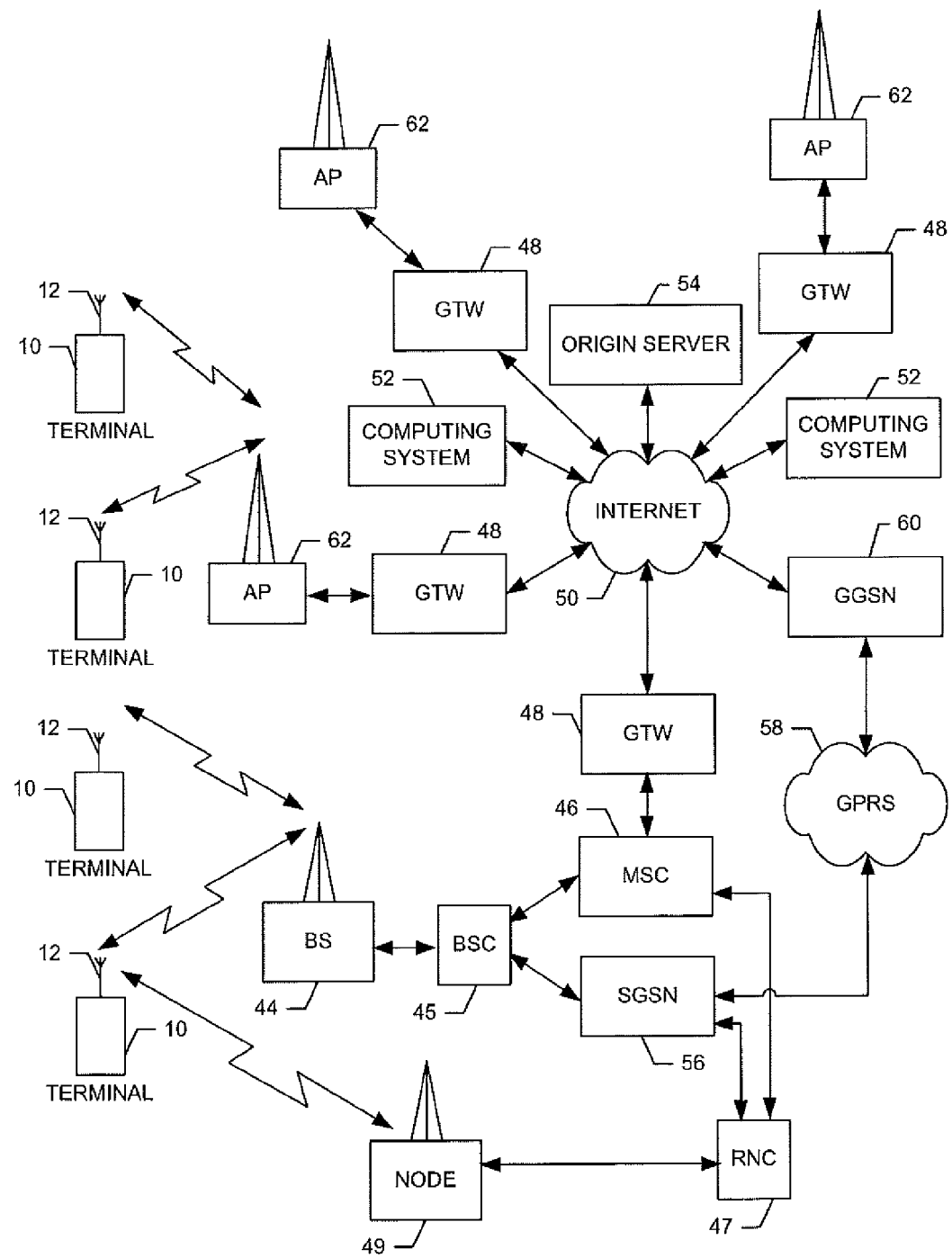
FIG. 1 is a schematic block diagram of a wireless communications system according to an exemplary embodiment of the present invention.

FIG. 1, one exemplary embodiment of the invention, illustrates a schematic block diagram of a wireless communications system according to an exemplary embodiment of the present invention. Referring now to FIG. 1, an illustration of one type of system that would benefit from embodiments of the present invention is provided. The system of FIG. 1 includes a plurality of network devices and one or more mobile terminals 10. The mobile terminals may be various different examples of mobile communication devices such as portable digital assistants (PDAs), pagers, mobile televisions, gaming devices, laptop computers, mobile phones, cameras, video recorders, audio/video players, radios, global positioning system (GPS) devices, or any combination of the aforementioned, and other types of voice and text communications devices. However, it should be understood that a mobile terminal as illustrated and hereinafter described is merely illustrative of one type of device that would benefit from embodiments of the present invention and, therefore, should not be taken to limit the scope of embodiments of the present invention.

In an exemplary embodiment, each mobile terminal 10 may include an antenna 12 (or multiple antennas) for transmitting signals to and for receiving signals from a network node such as a base site or base station (BS) 44. The base station 44 may be a part of one or more cellular or mobile networks each of which includes elements required to operate the network, such as a mobile switching center (MSC) 46. The mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 1, the MSC 46 is merely an exemplary network device and embodiments of the present invention are not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one example embodiment, however, the MSC 46 is coupled to a gateway device (GTW) 48, and the GTW 48 is coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system (two shown in FIG. 1), origin server 54 (one shown in FIG. 1) or the like, as described below.

The BS 44 may also be coupled to a serving GPRS (General Packet Radio Service) support node (SGSN) 56. The SGSN 56 may be capable of performing functions similar to the MSC 46 for packet switched services. The SGSN 56, like the MSC 46, may be coupled to a data network, such as the Internet 50.

The SGSN 56 may be directly coupled to the data network. In one example embodiment, however, the SGSN 56 is coupled to a packet-switched core network, such as a GPRS core network 58. The packet-switched core network of this embodiment is then coupled to another GTW 48, such as a gateway GPRS support node (GGSN) 60, and the GGSN 60 is coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as multimedia messaging service (MMS) messages. The GGSN 60 and SGSN 56 may also be capable of controlling the forwarding of messages for the mobile terminal 10 to and from the messaging center. In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as a Universal Mobile Telecommunications System (UMTS) network employing wideband code division multiple access (WCDMA) radio access technology or newer technologies such as E-UTRAN, which is alternately referred to as LTE (long term evolution). Some narrow-band analog mobile phone service (NAMPS), as well as total access communication system (TACS), network(s) may also benefit from embodiments of the present invention, as may dual or higher mode mobile stations.

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 may be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52.

Although not shown in FIG. 1, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 may additionally, or alternatively, include a removable memory capable of storing content, which may thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In some embodiments, the mobile terminal 10 may be capable of receiving communication from multiple cells (e.g., multiple BSs or APs) at any given time. Furthermore, in some embodiments, the system of FIG. 1 could represent a multi-RAT environment. In this regard, for example, the BS 44 may be coupled to the SGSN 56 and the MSC 46 via a base station controller (BSC) 45 that may control the BS 44. The BS 44 and the BSC 45 may be associated with a first RAT (e.g., a 2G or other RAT). Meanwhile, the SGSN 56 and the MSC 46 may also be coupled to a radio network controller (RNC) 47 of a second RAT (e.g., a 3G or other RAT). The RNC 47 may in turn be in communication with one or more nodes (e.g., node-Bs or e-node-Bs) 49, one or more of which may be capable of communication with the mobile terminal 10 at any given time. As such, the mobile terminal 10 may be configured to be able to communicate with (e.g., select a cell associated with) either the first RAT or the second RAT. Furthermore, additional RATs may also be included in the system of FIG. 2 so that the mobile terminal 10 may be enabled to communicate with any of a plurality of different RATs.

Figure 2:
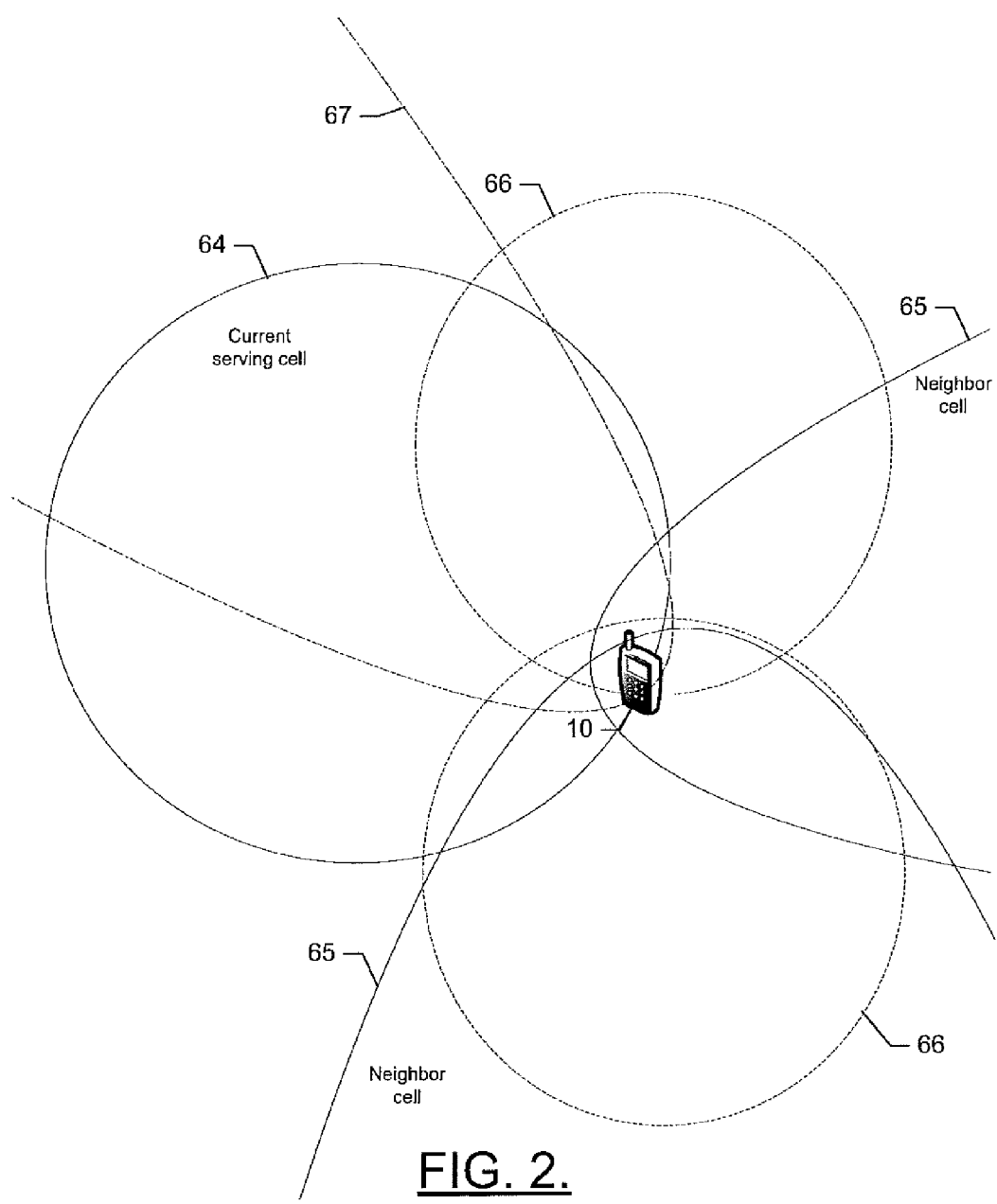
FIG. 2 illustrates an example of multiple candidate cells in a multi-RAT environment according to an exemplary embodiment of the present invention.

FIG. 2 illustrates an example of multiple different cells in a multi-RAT environment according to an exemplary embodiment. In this regard, as shown in FIG. 2, the mobile terminal 10 may be positioned in a location where the mobile terminal 10 is within range of several base stations, access points and/or nodes. In other words, the mobile terminal 10 may be within or at least proximate to a plurality of communication cells defining a coverage area of corresponding base stations, access points and/or nodes. As such, the mobile terminal 10 may be in a multi-RAT environment where cells associated with different RATs overlap to some degree. As shown in FIG. 2, the mobile terminal 10 may be in communication with a current serving cell 64, but may also be capable of receiving communications transmitted from other cells that may be from the same and/or other RATs. For example, the cells drawn in solid lines may include the current serving cell 64 and neighbor cells or first candidate cells 65, which may be associated with a first RAT (e.g., 2G, 3G, E-UTRAN, 4G or the like). In an exemplary embodiment, the current serving cell 64 and the first candidate cells 65 may each be associated with any particular RAT. Meanwhile, cells drawn in dashed lines may include second candidate cells 66 associated with a second RAT (e.g., a different RAT). Although, embodiments of the invention do not require three or more RATs, a third RAT (e.g., E-UTRAN) may also have one or more third candidate cells 67 that are receivable by the mobile terminal 10. As such, FIG. 2 merely illustrates one example of what may be considered a multi-RAT environment. According to an exemplary embodiment, all cells received by the mobile terminal 10, other than the current serving cell 64, may be considered candidates for reselection by the mobile terminal 10 in case the mobile terminal 10 moves or experiences conditions with respect to the current serving cell 64 that may require or otherwise make a reselection of another serving cell advantageous or desirable. Thus, for example, if communication with the current serving cell 64 is lost or if parameters associated with such communication suggest or otherwise indicate that cell reselection may be desirable, the mobile terminal 10 may reselect one of the candidate cells. When such a reselection is initiated, the communication node associated with the current serving cell 64 (e.g., base station, access point or node) may be considered to be a source node associated with a corresponding source RAT. Meanwhile, the communication node associated with the cell to be reselected may be considered to be a target node associated with a corresponding target RAT.

As discussed above, decisions regarding cell reselection may be made based on priority and/or ranking information. In particular, in a multi-RAT environment in which a target network does not support a priority based cell reselection algorithm, the mobile terminal 10 may be required to run a priority based and a ranking based algorithm in parallel, thereby increasing complexity. Embodiments of the present invention may provide for a mechanism by which complexity reduction may be achieved by making the running of parallel cell reselection algorithms unnecessary. In this regard, for example, embodiments of the present invention may provide for enabling the network operator to set broadcast and/or dedicated priorities for all networks irrespective of the cell reselection algorithms they support.

Figure 3:
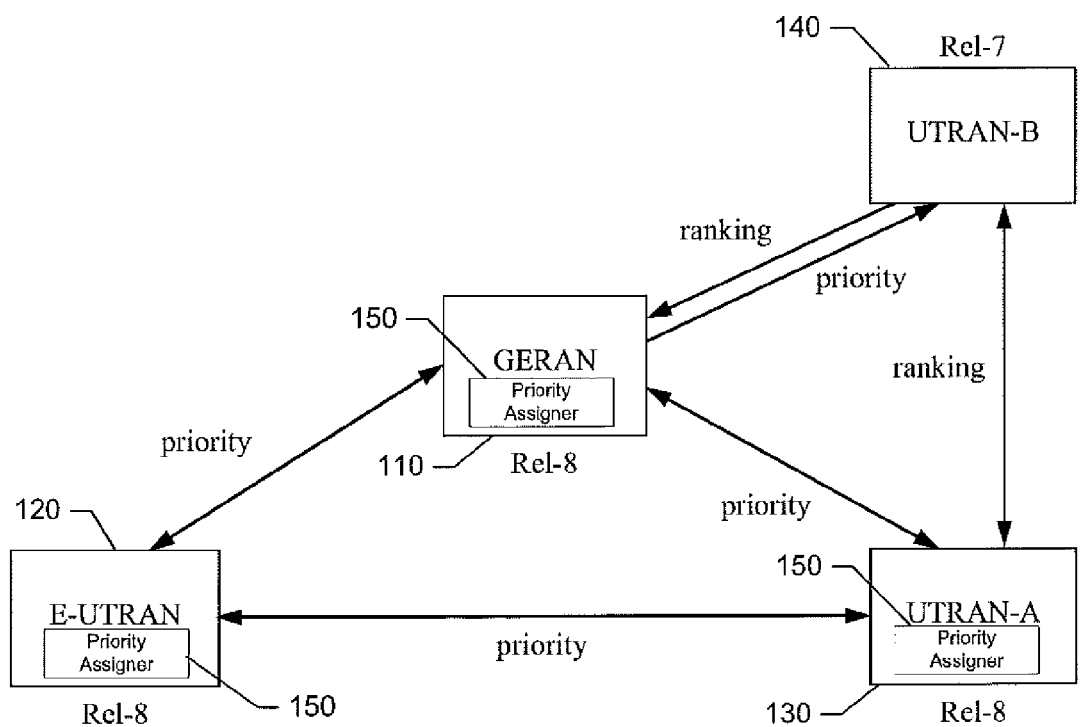
FIG. 3 illustrates a scenario in which multiple RATs are interworking and some of those RATs include a priority assigner according to an exemplary embodiment of the present invention.

FIG. 3 illustrates a scenario in which multiple RATs are interworking and one or more RATs include a priority assigner according to an exemplary embodiment of the present invention. In this regard, as shown in FIG. 3, the system may include various networks supporting RATs including GERAN (e.g., GERAN 110), E-UTRAN (e.g., E-UTRAN 120) and UTRAN (e.g., UTRAN A 130 and UTRAN B 140). In this example, GERAN 110, E-UTRAN 120 and UTRAN A 130 may be assumed to be upgraded to support procedures of 3GPP Rel-8 or later (therefore using priority reselection), whereas UTRAN B 140 may be assumed to be Rel-7 or older (therefore using ranking reselection). As shown in FIG. 3, the RATs supporting priority reselection (e.g., GERAN 110, E-UTRAN 120 and UTRAN A 130) may include a priority assigner 150, which may be embodied as a priority assignment element or module configured to perform priority assignment for networks including at least networks that support priority reselection. The priority assignment could include both broadcast priorities (i.e. priority provided to all mobile stations by means of broadcast signaling) or dedicated priorities (i.e. individual priorities provided to one or more mobile stations by means of dedicated signaling). As expected for a network that supports priority based cell reselection, the priority assigner 150 may be configured to signal priorities associated with each RAT to the mobile terminal 10 to enable the mobile terminal 10 to make cell reselections based on the provided priorities associated with each RAT. Accordingly, while in the GERAN 110, the mobile terminal 10 may be enabled to employ only the priority based algorithm without having to run another algorithm such as the ranking based algorithm in parallel. The priority assigner 150 may enable this functionality by providing for assignment of broadcast and/or dedicated priorities (e.g., individual priorities) for each of the other RATs irrespective of the algorithm they support for cell reselection.

Accordingly, conventional systems that only support legacy reselection may be upgraded to provide network operators with the flexibility and capability of defining or otherwise setting parameters associated with threshold values relative to levels measured in serving RATs to enable consideration for cell reselection of candidate RATs that may employ priority based cell reselection. The network operators may thereby establish parameters that avoid ping-pong cell reselection that may occur if conflicting reselection commands are encountered because of the use of different reselection algorithms in different networks. This allows the possibility to use the priority based algorithm for reselection to networks that do not support priority based cell reselection. This leads to the advantage that it is not required for mobile terminals to run parallel algorithms. In conventional systems, if a mobile terminal applies individual priorities received through dedicated signaling and priority information is available only for some inter-RAT frequencies of a RAT, cells belonging to frequencies of that RAT for which no individual priority is available or no threshold is broadcast in system information may not be considered for measurement and for cell re-selection. If individual priorities have been received through dedicated signalling in a network other than the serving network, where such network belongs to a different RAT, at inter-RAT cell (re)selection the mobile terminal may continue to use the priorities provided by dedicated signaling until expiry of a validity time associated with the priorities or until the priorities are deleted according to the specification of the (re)selected RAT. Additionally, the priority information and remaining validity time may be inherited to the corresponding information in the (re)selected RAT.

In the exemplary embodiment of FIG. 3, GERAN 110, E-UTRAN 120 and UTRAN A 130 each support priority based cell reselection, but UTRAN B 140 would not support priority based cell reselection. Instead, UTRAN B 140 supports the ranking algorithm for cell reselection. According to prior art, the GERAN 110 may send broadcast or dedicated priorities for E-UTRAN 120 and UTRAN A 130 normally. However, according to exemplary embodiments of the invention, the priority assigner 150 may further enable the network operator to define broadcast and/or dedicated priorities for UTRAN B 140 even though UTRAN B 140 supports the ranking algorithm instead of the priority algorithm.

When the mobile terminal 10 is in E-UTRAN 120, the mobile terminal 10 would receive dedicated priorities for the serving cell (e.g., E-UTRAN 120) and neighboring cells (e.g., GERAN 110 and UTRAN A 130). However, when the mobile terminal 10 moves to the GERAN 110, with dedicated priorities still valid, due to prior GERAN rules, priority reselection would apply with respect to E-UTRAN 120 and UTRAN A 130, but UTRAN B 140 would be ignored due to its lack of any dedicated priority. Thus, the mobile terminal 10 would never select UTRAN B 140.

According to an exemplary embodiment, E-UTRAN 120 may send dedicated priorities for GERAN 110 and UTRAN A 130 normally. However, the priority assigner 150 in E-UTRAN 120 may further enable the network operator to define a dedicated priority to UTRAN B 140 and signal it to the mobile terminal even though UTRAN B 140 supports the ranking algorithm instead of the priority algorithm. Thus, in relation to the example described above where the mobile terminal 10 moves into the GERAN 110, the mobile terminal 10 can use the priority algorithm for reselection towards UTRAN B and reselection towards UTRAN B is not blocked. In this regard, the priority assigner 150 may enable the definition of dedicated priority parameters for networks regardless of the cell reselection algorithm associated with the respective networks.

Figure 4:
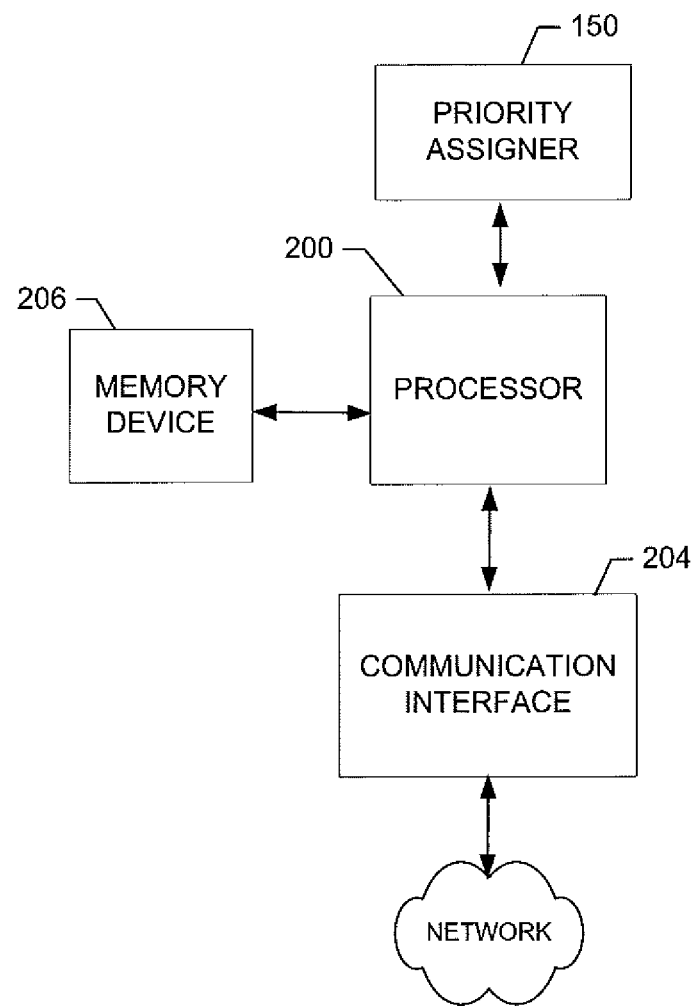
FIG. 4 illustrates a block diagram of an apparatus for enabling priority based cell reselection in a multi-RAT environment according to an exemplary embodiment of the present invention.

FIG. 4 illustrates an example apparatus for performing an exemplary embodiment of the present invention. The apparatus may be included in or embodied at a network device of the RAT employing an embodiment of the present invention (e.g., GERAN). The network device may be a portion of, for example, the base station subsystem (BSS) of the corresponding RAT. Accordingly, the apparatus may operate in connection with a serving cell providing dedicated priority information to a mobile terminal 10 (or UE) operating within the corresponding cell in a multi-RAT environment.

Referring now to FIG. 4, an apparatus for enabling priority based cell reselection in a multi-RAT environment is provided. The apparatus may include or otherwise be in communication with a processor 200, a communication interface 204 and a memory device 206. The memory device 206 may include, for example, volatile and/or non-volatile memory. The memory device 206 may be configured to store information, data, applications, instructions or the like for enabling the apparatus to carry out various functions in accordance with exemplary embodiments of the present invention. For example, the memory device 206 could be configured to buffer input data for processing by the processor 200. Additionally or alternatively, the memory device 206 could be configured to store instructions for execution by the processor 200. As yet another alternative, the memory device 206 may be one of a plurality of databases that store information in the form of static and/or dynamic information, for example, in association with a particular location, event or service point.

The processor 200 may be embodied in a number of different ways. For example, the processor 200 may be embodied as a processor, a coprocessor, a controller or various other processing means or devices including integrated circuits such as, for example, an ASIC (application specific integrated circuit) or FPGA (field programmable gate array). In an exemplary embodiment, the processor 200 may be configured to execute instructions stored in the memory device 206 or otherwise accessible to the processor 200. As such, whether configured by hardware or software methods, or by a combination thereof, the processor 200 may represent an entity capable of performing operations according to embodiments of the present invention while configured accordingly. Thus, for example, when the processor 200 is embodied as an ASIC, FPGA or the like, the processor 200 may be specifically configured hardware for conducting the operations described herein. Alternatively, as another example, when the processor 200 is embodied as an executor of software instructions, the instructions may specifically configure the processor 200, which may otherwise be a general purpose processing element if not for the specific configuration provided by the instructions, to perform the algorithms and operations described herein. However, in some cases, the processor 200 may be a processor of a specific device (e.g., a SGSN) adapted for employing embodiments of the present invention by further configuration of the processor 200 by instructions for performing the algorithms and operations described herein.

Meanwhile, the communication interface 204 may be embodied as any device or means embodied in either hardware, software, or a combination of hardware and software that is configured to receive and/or transmit data from/to a network and/or any other device or module in communication with the apparatus. In this regard, the communication interface 204 may include, for example, an antenna (or antennas) and supporting hardware and/or software for enabling communications with a wireless communication network. In fixed environments, the communication interface 204 may alternatively or also support wired communication. As such, the communication interface 204 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 204 may include hardware and/or software for supporting communication mechanisms such as Bluetooth, Infrared, UWB, WiFi, and/or the like.

In an exemplary embodiment, the processor 200 may be embodied as or otherwise control the priority assigner 150. The priority assigner 150 may be any means or device embodied in hardware, software, or a combination of hardware and software that is configured to carry out the functions of the priority assigner 150 as described herein. In this regard, for example, the priority assigner 150 may be configured to receive an indication of candidate cells with respect to cell reselection of a mobile terminal in the corresponding network of the apparatus. The priority assigner 150 may then assign a dedicated priority toward each of the candidate cells in which at least one of the candidate cells includes a candidate cell that does not support priority based cell reselection. Subsequent to assigning a dedicated priority to each of the candidate cells, the dedicated priorities may be provided to the mobile terminal for each respective candidate cell including the candidate cell that does not support priority based cell reselection.

Figure 5:
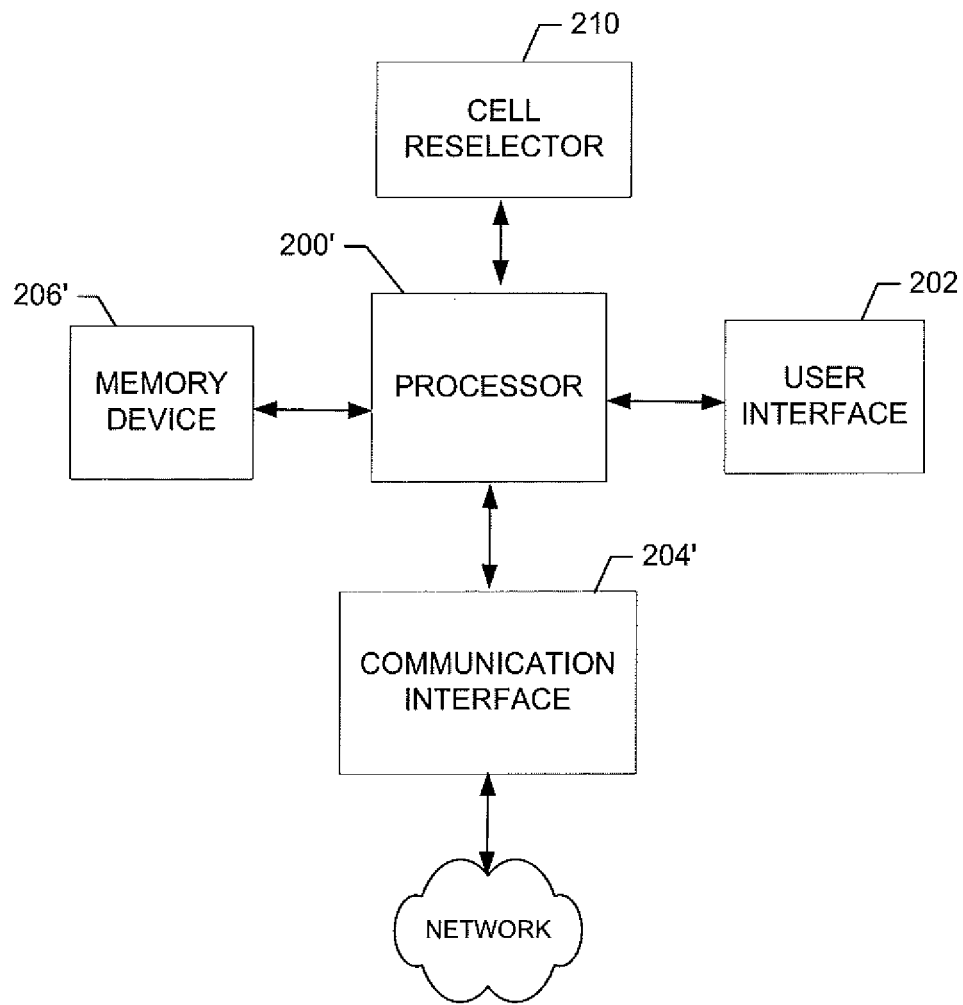
FIG. 5 illustrates a block diagram of a mobile terminal for enabling priority based cell reselection in a multi-RAT environment according to an exemplary embodiment of the present invention.

In an exemplary embodiment, the mobile terminal 10 may include, among other things, a processor 200', a communication interface 204' and a memory device 206' as shown in FIG. 5. Each of the processor 200', the communication interface 204' and the memory device 206' may be similar in function to the descriptions provided above in reference to FIG. 4. The mobile terminal 10 may further include a user interface 202, which may include a keyboard, touch screen, display, mouse, joystick, cursor, microphone, speaker or any of numerous other devices for providing interface mechanisms for the user. The mobile terminal 10 may also include a cell reselector 210. The cell reselector 210 may be any means or device embodied in hardware, software, or a combination of hardware and software that is configured to carry out the functions of the cell reselector 210 as described herein. In this regard, the cell reselector 210 may be configured to receive dedicated priority information from at least one RAT that does not support a priority reselection algorithm and thereafter perform cell reselection based at least in part on the dedicated priority information from the at least on RAT that does not support the priority reselection algorithm.

FIGS. 6 and 7 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a network device (e.g., a BSS) or mobile terminal and executed by a processor in the network device or mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for enabling priority based cell reselection in a multi-RAT environment as provided in FIG. 6 may include receiving an indication of candidate cells with respect to cell reselection of a mobile terminal in the corresponding network of an apparatus performing the method at operation 300. Notably, operation 300 could occur at another point during the performance of the method and therefore need not necessarily be an initial operation. The method may further include assigning a dedicated priority toward a plurality of the candidate cells in which at least one of the candidate cells includes a candidate cell that does not support priority based cell reselection at operation 310. Subsequent to assigning a dedicated priority to each of the candidate cells, the method may further include providing the dedicated priorities to the mobile terminal for respective candidate cells including the candidate cell that does not support priority based cell reselection at operation 320.

FIG. 7 provides a method for enabling priority based cell reselection in a multi-RAT environment from the perspective of a mobile terminal. In this regard, the method may include receiving dedicated priority information from at least one RAT that does not support a priority reselection algorithm at operation 350 and thereafter performing cell reselection based at least in part on the dedicated priority information from the at least on RAT that does not support the priority reselection algorithm at operation 360 by running a priority reselection algorithm.

In an exemplary embodiment, an apparatus for performing the methods above may include a processor (for example, the processor 200 or 200') configured to perform each of the operations (300-320 or 350 to 360) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 300 to 320 may include, for example, code, instructions, a module or an algorithm for managing operation of the priority assigner 150 or the processor 200.

Meanwhile, exemplary means for performing operations 350 to 360 may include, for example, a computer program product, module or algorithm for managing operations of the cell reselector 210 or the processor 200'.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
receiving an indication designating a plurality of candidate cells with respect to cell reselection by a mobile terminal;
assigning a priority to each of said plurality of candidate cells, wherein at least one candidate cell of the plurality of candidate cells does not support priority based cell reselection, wherein assigning a priority to the at least one candidate cell that does not support priority based cell reselection comprises determining at least one priority parameter for the candidate cell; and
configuring a message for delivery to said mobile terminal, wherein the message comprises information specifying said priorities, and wherein configuring the message comprises including in the message information relating to the at least one priority parameter for the candidate cell that does not support priority based cell reselection.

2. The method according to claim 1, wherein at least one of said priorities is one of a broadcast and a dedicated priority.

3. The method of claim 2, wherein at least one of said priorities is a dedicated priority including a validity time.

4. The method according to claim 1, wherein at least one of said priorities is a broadcast priority assigned to a candidate cell that supports priority based cell reselection and wherein at least one of said priorities is a dedicated priority assigned to a candidate cell that does not support priority based cell reselection.

5. The method of claim 1, wherein the indication designating the plurality of candidate cells includes an indication for each cell as to whether the cell supports priority-based cell reselection.

6. The method of claim 1, wherein at least one priority parameter for a candidate cell is chosen so as to avoid ping-pong cell reselection.

7. A computer readable memory storing a program of instructions, execution of which by a processor configures an apparatus to at least:
receive an indication designating a plurality of candidate cells with respect to cell reselection by a mobile terminal;
assign a priority to each of said plurality of candidate cells, wherein at least one candidate cell of the plurality of candidate cells does not support priority based cell reselection, wherein assigning a priority to the at least one candidate cell that does not support priority based cell reselection comprises determining at least one priority parameter for the candidate cell; and
configure a message for delivery to said mobile terminal, wherein the message comprises information specifying said priorities, and wherein configuring the message comprises including in the message information relating to the at least one priority parameter for the candidate cell that does not support priority based cell reselection.

8. The computer readable memory of claim 7, wherein at least one of said priorities is one of a broadcast and a dedicated priority.

9. The computer readable memory of claim 8, wherein at least one of said priorities is a dedicated priority including a validity time.

10. The computer readable memory according to claim 7, wherein at least one of said priorities is a broadcast priority assigned to a candidate cell that supports priority based cell reselection and wherein at least one of said priorities is a dedicated priority assigned to a candidate cell that does not support priority based cell reselection.

11. The computer readable memory of claim 7, wherein the indication designating the plurality of candidate cells includes an indication for each cell as to whether the cell supports priority-based cell reselection.

12. An apparatus comprising:
   at least one processor;
   memory storing computer program code; and
   wherein the memory and the at least one processor are configured to cause an apparatus to at least:
   receive an indication designating a plurality of candidate cells with respect to cell reselection by a mobile terminal;
   assign a priority to each of said plurality of candidate cells, wherein at least one candidate cell of the plurality of candidate cells does not support priority based cell reselection, wherein assigning a priority to the at least one candidate cell that does not support priority based cell reselection comprises determining at least one priority parameter for the candidate cell;
   configure a message for delivery to said mobile terminal, wherein the message comprises information specifying said priorities, and wherein configuring the message comprises including in the message information relating to the at least one priority parameter for the candidate cell that does not support priority based cell reselection.

13. A network device comprising an apparatus according to claim 12.

14. The apparatus of claim 12, wherein at least one of said priorities is one of a broadcast and a dedicated priority.

15. The apparatus memory of claim 14, wherein at least one of said priorities is a dedicated priority including a validity time.

16. The apparatus according to claim 12, wherein at least one of said priorities is a broadcast priority assigned to a candidate cell that supports priority based cell reselection and wherein at least one of said priorities is a dedicated priority assigned to a candidate cell that does not support priority based cell reselection.

17. The computer readable memory of claim 12, wherein at least one priority parameter for a candidate cell is chosen so as to avoid ping-pong cell reselection.

18. The apparatus of claim 12, wherein the indication designating the plurality of candidate cells includes an indication for each cell as to whether the cell supports priority-based cell reselection.

19. The apparatus of claim 12, wherein at least one priority parameter for a candidate cell is chosen so as to avoid ping-pong cell reselection.

* * * * *